United States Patent [19]

Chrobaczek et al.

[11] Patent Number: 5,403,886
[45] Date of Patent: Apr. 4, 1995

[54] AQUEOUS DISPERSIONS OF POLYSILOXANES

[75] Inventors: Harald Chrobaczek, Augsburg; Günther Tsuchida, Schwabmünchen, both of Germany

[73] Assignee: Ciba-Geigy Corporation, Ardsley, N.Y.

[21] Appl. No.: 889,684

[22] Filed: May 27, 1992

[30] Foreign Application Priority Data

May 31, 1991 [DE] Germany .................. 41 17 864.5

[51] Int. Cl.$^6$ ................. C08L 83/00; C08L 83/04; B01J 13/00
[52] U.S. Cl. ................. 524/838; 524/864; 252/8.8; 252/312; 106/287.11; 106/287.12
[58] Field of Search .......... 524/838, 864; 252/8.8, 252/312; 106/287.11, 287.12

[56] References Cited

U.S. PATENT DOCUMENTS

| | | | |
|---|---|---|---|
| 3,853,607 | 12/1974 | Jyengar et al. | 117/138.8 F |
| 3,960,575 | 6/1976 | Martin | 106/287.11 |
| 3,962,500 | 6/1976 | Smith | 427/387 |
| 4,366,001 | 12/1982 | Ona et al. | 106/287.11 |
| 4,376,149 | 3/1983 | Martin | 428/266 |
| 4,390,650 | 6/1983 | Diener et al. | 524/266 |
| 4,496,687 | 1/1985 | Okada et al. | 524/859 |
| 4,509,981 | 4/1985 | Sanders, Jr. et al. | 106/287.11 |
| 4,620,878 | 11/1986 | Gee | 106/287.15 |
| 4,680,366 | 7/1987 | Tanaka et al. | 106/287.12 |
| 4,844,888 | 7/1989 | Zawadzki | 106/287.11 |
| 4,874,662 | 10/1989 | Huhn | 428/266 |
| 4,973,620 | 11/1990 | Ona et al. | 106/287.11 |
| 4,978,561 | 12/1990 | Cray et al. | 427/387 |
| 5,025,076 | 6/1991 | Tanaka et al. | 528/33 |
| 5,045,231 | 9/1991 | Braun et al. | 252/315.1 |
| 5,057,572 | 10/1991 | Chrobaczek et al. | 524/588 |
| 5,078,747 | 1/1992 | Rästele et al. | 8/181 |

FOREIGN PATENT DOCUMENTS

| | | |
|---|---|---|
| 0220400 | 5/1987 | European Pat. Off. . |
| 0342830 | 11/1989 | European Pat. Off. . |
| 0342834 | 11/1989 | European Pat. Off. . |
| 0378828 | 7/1990 | European Pat. Off. . |
| 0399706 | 11/1990 | European Pat. Off. . |
| 0417047 | 3/1991 | European Pat. Off. . |
| 4004946 | 8/1991 | Germany . |
| 341245 | 5/1972 | Switzerland . |
| 2159547 | 12/1985 | United Kingdom . |
| 1198615 | 7/1990 | United Kingdom . |

OTHER PUBLICATIONS

Chem. Abstract 115(10):94369v.
Chem. Abstract 115(18):184570h.
Patent Abstracts of Japan for JP 01-221580.
Patent Abstract of Japan for JP 02-182976.
Patent Abstract of Japan for JP 02-154076.
Textile Chemist and Colorist, vol. 18, No. 3 pp. 34-37.

*Primary Examiner*—Melvyn I. Marquis
*Assistant Examiner*—Karen A. Dean
*Attorney, Agent, or Firm*—Kevin T. Mansfield

[57] ABSTRACT

Aqueous dispersions which are suitable for the treatment of fibre materials, in particular textile materials, contain a polysiloxane having on average at least two hydroxyl groups bound to one silicon atom each and one polysiloxane having on average at least one amido group in the molecule. If the amidopolysiloxane does not contain a primary amino group, a third polysiloxane containing at least one primary amino group in the molecule must be additionally present in the dispersion. The fibre materials treated with these dispersions have a pleasant soft handle and a low tendency to yellow. The dispersant content can be lower than in known dispersions of amido-functional polysiloxanes.

16 Claims, No Drawings

AQUEOUS DISPERSIONS OF POLYSILOXANES

The invention relates to aqueous dispersions containing at least two mutually different polysiloxanes of particular types, and to the use of such dispersions for the treatment of fibre materials.

The use of aqueous dispersions of polysiloxanes for the treatment of fibre materials, such as, for example, textile sheet-like structures, is known. The polysiloxanes already used for this purpose include those containing amino groups at the terminals of the main chains or in side chains of the polysiloxane. This is described, for example, in EP-A 0,138,192 or in WO 88/08,436. By means of such amino-functional polysiloxanes, the finished textiles can be given a pleasant soft handle. A disadvantage of using aqueous dispersions containing only such amino-functional polysiloxanes is that the finished textile materials have a tendency to yellow, especially after treatment at elevated temperature. A reduced tendency to yellow than in the case of purely amino-functional polysiloxanes is observed upon treatment of the textile materials with polysiloxanes containing amido groups. This is described, for example, by EP-A 0,342,830 and EP-A 0,342,834. The polysiloxanes mentioned there additionally contain primary and/or secondary amino groups.

Attempts to combine the favourable properties of amido-functional polysiloxanes (reduced tendency to yellow) with those of amino-functional polysiloxanes (still softer handle), either by using a polysiloxane containing amido and amino groups in the same molecule or by using two different polysiloxanes, one of which contains amido and the other amino groups did not lead to an optimum result. The reason for this was that relatively large amounts of dispersants are necessary for obtaining stable aqueous dispersions of such products. The nonionic ethylene oxide adducts of fatty alcohols, fatty acids, alkylphenols and fatty amines usually used for this purpose as dispersants lead to unsatisfactory rubfastness of the finished fibre materials, especially if very large amounts are used.

Problems with respect to wash fastness of the finish can also arise.

The object of the present invention was to provide aqueous dispersions of polysiloxanes which, as a result of the presence of amino and amido groups, impart to the fibre materials finished therewith a soft handle and low tendency to yellow in combination with good rubfastness and good wash fastness.

The object was achieved by an aqueous dispersion containing at least the following components
  a) a nitrogen-free polysiloxane having on average at least 2 hydroxyl groups directly bound to one silicon atom each
  b) a polysiloxane containing on average at least one amido group in the molecule
with the proviso that either component b) additionally contains at least one primary amino group or that the dispersion additionally contains, as component c), a polysiloxane having on average at least one primary amino group in the molecule.

Surprisingly, it has been found that the presence of component a), i.e. a nitrogen-free polysiloxane having on average at least 2 hydroxyl groups directly bound to one silicon atom each, has the effect that the content of usually used dispersants of the abovementioned types can be kept lower than in known compositions not containing this component a). Fibre materials finished by means of the dispersions according to the invention had a pleasant soft handle, low tendency to yellow, good rubfastness and good wash fastness. Suitable preparation processes described in more detail below make it possible, for example, to prepare dispersions according to the invention in the form of microemulsions.

The dispersions according to the invention contain at least components a) and b) mentioned above. If a polysiloxane containing amido groups but no primary amino groups is used as component b), a third component c) must additionally be present in the dispersions according to the invention. Component c) is a polysiloxane containing on average at least one primary amino group in the molecule. However, component c) can additionally contain one or more amido groups. This means that amido-functional polysiloxanes having additional amino groups and amido-functional polysiloxanes without primary amino groups can be present side by side in the dispersions according to the invention. Polysiloxanes containing primary amino groups are required in the dispersions according to the invention because the primary amino groups improve the pleasant soft handle of the finished fibre materials still further. If component b) contains not only amido groups but also primary amino groups, the presence of a component c) is admittedly not absolutely necessary. However, a preferred embodiment of the dispersions according to the invention consists in the presence of a component c), i.e. a polysiloxane having primary amino groups, even in the case where component b) is a polysiloxane containing not only amido but also primary amino groups. Component c) is preferably a polysiloxane containing no amido groups. Not only component b) but also component c) can, in addition to the nitrogen functions, additionally contain other functional groups, such as, for example, hydroxyl groups. Examples of nitrogen-containing components b) and c) suitable for dispersions according to the invention are those having a linear polysiloxane skeleton and carrying on the two terminal silicon atoms in each case a hydroxyl group directly bound to one Si.

Polysiloxanes in the context of the invention are understood to mean those compounds having on average at least 10 Si—O— units in the molecule. Polysiloxanes having 100 to 1000 Si—O— units are preferably used as components b) and c). In contrast, low-molecular-weight polysiloxanes having low viscosity are preferably used as component a). Owing to the fact, which is known to one skilled in the art, that a certain distribution of chain lengths is present in polymers, the abovementioned number of at least 10 Si—O— units refers to the average which a fairly large number of molecules has. The numbers given as "average" in the patent claims and in the description with respect to the number of functional groups in the polysiloxane are also based on the fact that the number of functional groups present in the individual molecules is subject to a certain distribution. Accordingly, it is quite possible that individual molecules of components a), b) and c) contain fewer functional groups than stated in the patent claims by the expression "at least . . . .", as long as this minimum value is achieved on average in a relatively large number of molecules.

Components a), b) and c) can each be a polysiloxane having an unbranched (Si—O)$_x$ chain, although the chains can also be branched, so that Si—O— units appear not only in one chain. The hydroxyl groups of component a) directly bound to one Si atom each can be present at the two terminals of the main chain; in this case, additional hydroxyl groups can be present in side chains, and in addition one or more hydroxyl groups can also be directly bound to non-terminal silicon atoms of the main chain. The two hydroxyl groups which (on average) are present at least in component a), do not however have to be both bound to terminal silicon atoms of the main chain; rather, one or both of these hydroxyl groups can also be directly bound to one non-terminal silicon atom each. In this case, 3 methyl groups are preferably bound to the terminal silicon atoms free of hydroxyl groups.

The amido groups and primary amino groups present in components b) and c) are preferably bound via divalent radicals to one silicon atom each, preferably not to terminal silicon atoms of the polysiloxane chain but in each case to one silicon atom each within the chain. The divalent radicals mentioned located between the particular silicon atom and the primary amino group or amido group are preferably alkylene radicals. These can be interrupted by a sulphur or oxygen atom. Particularly favourable results are obtained if these alkylene radicals are interrupted by an NH group. In the case of this particularly preferred embodiment, a secondary amino group is present between the primary amino group and the relevant silicon atom of component c), and in component b) too, a secondary amino group is preferably present between the amido group and the relevant silicon atom. If component b) additionally contains radicals which are free of amido groups and contain primary amino groups, one or more of these primary amino groups are also preferably bound to the relevant silicon atom via an alkylene group interrupted by a secondary amino group. If component c) contains on average more than one primary amino group in the molecule, at least one is preferably bound to a silicon atom via an alkylene radical interrupted by a secondary amino group.

Components a) which are particularly suitable for the dispersions according to the invention are polysiloxanes derived from polydimethylsiloxanes by replacing on average at least two methyl groups per molecule by hydroxyl groups. Components b) and c) are preferably derived from polydimethylsiloxanes by replacing on average at least one methyl group by a radical containing an amido or a primary amino group. This means that components a), b) and c) are preferably polysiloxanes in which all radicals bound to silicon atoms and containing neither oxygen nor nitrogen are methyl radicals.

Products which are suitable as component a) are described in DE-PS 3,035,824 and in DE-AS 2,459,936. Polysiloxanes of this type having on average at least two hydroxyl groups directly bound to one silicon atom each are commercially available. In component a), on average at least two hydroxyl groups per molecule are directly bound to one silicon atom each, i.e. the polysiloxane contains on average at least two —Si—OH units. Preferably used as component a) are polysiloxanes, in particular those based on polydimethylsiloxane and containing on average 0.1 to 0.5 hydroxyl groups per silicon atom. If on average more than two hydroxyl groups are present per molecule, at least two must be directly bound to one silicon atom each, while the remaining ones can also be directly bound to one silicon atom each or alkylene bridges, in particular alkylene bridges having 1 to 4 carbon atoms, can be present between the hydroxyl groups and the relevant silicon atoms. The average number of hydroxyl groups per silicon atom can be determined in the following manner: the ratio of the number of Si atoms to which hydroxyl groups are bound, some of them possibly by alkylene bridges, to the number of Si atoms to which no OH groups or radicals containing OH groups are bound is determined, if appropriate after previous removal of the polysiloxane serving as component a) from the nitrogen-containing polysiloxanes, by $^{29}$Si NMR spectroscopy. This removal may become necessary if component a) is present in the mixture with amido- or amino-functional polysiloxanes containing hydroxyl groups and can be effected by gel permeation chromatography.

It has proved to be favourable to use, as component a), liquids of relatively low viscosity, i.e. of viscosity in the range from 30 to 70 mPa.s at 20° C. If these products of low viscosity are used, the percentage of dispersant in the form of ethoxylated products can be lowered even further.

Polysiloxanes containing on average at least one amido group in the molecule and suitable as component b) and the preparation thereof are described in EP-A 0,342,830 and in EP-A 0,342,834. These publications furthermore describe polysiloxanes containing, in addition to a side chain containing a secondary amino group and an amido group, a side chain containing a secondary and a primary amino group. These polysiloxanes are also very suitable for the dispersions according to the invention as component b). When products of this type, which, apart from amido groups, additionally contain primary amino groups, are used, it is no longer absolutely necessary, but advantageous, to add to the dispersions according to the invention (as component c) a polysiloxane containing on average at least one primary and, where appropriate, additionally one or more secondary amino groups in the molecule, but no amido groups. This makes it possible to achieve an even softer handle of the finished fibre material.

Products used as component b) are preferably those derived from polydimethylsiloxanes by replacing one or more methyl groups each by a radical R which in each case contains two nitrogen atoms. At least one of the radicals R must contain an amido group, some or all of the others can also contain one or two amido groups. It is favourable if in all of these radicals R one of the two nitrogen atoms is present as a secondary amino group, and the other either as an amido group or as a primary amino group, it being necessary however for on average at least one amido group to be present per molecule. Polysiloxanes which are highly suitable as component b) of the dispersions according to the invention are those which contain one or more radicals bound to one silicon atom each of the formula

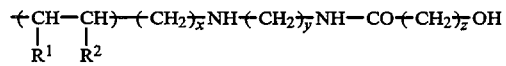

in which $R^1$ and $R^2$, independently of one another, are H or $CH_3$, but at least one of these radicals is H, x is a number from 0 to 3 and y and z, independently of one another, are a number from 2 to 4.

Instead of the terminal hydroxyl groups, other hydrophilic groups, for example polyoxyethylene units, can be present in these radicals. Hydrophilic terminal groups facilitate dispersion of these amido-functional polysiloxanes. The amido-functional polysiloxanes containing the abovementioned radicals are preferably also derived from polydimethylsiloxanes by suitable substitution. Apart from the radicals described by the above formula, they preferably contain either only methyl groups additionally bound to silicon or only radicals also containing two nitrogen atoms, which are present, for example, in the form of a primary and a secondary amino group; for the last-mentioned type of radicals, those such as are described below as favourable embodiment for component c) are preferred.

In the abovementioned formula for the radicals containing amido groups, y and z, independently of one another, are preferably 2 or 3 and x is preferably 1 or 2.

Component c) contains on average at least one primary amino group per molecule. The polysiloxane preferably used as component c) is one which contains no amido groups, in particular a polydimethylsiloxane in which one or more methyl groups are each replaced by a radical of the formula $-(CHR^3)_t NH_2$ or a radical of the formula

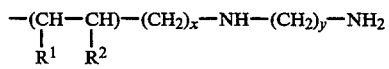

in which $R^1$, $R^2$, x, y have the meaning given in claim 9, t has a value from 2 to 4, and all radicals $R^3$ are, independently of one another, H or $CH_3$. Preferred values for x in these radicals are 1 or 2 and for y values from 2 to 4 are preferred.

Polysiloxanes which are suitable as component c) are described in EP-A 0,138,192 and in WO 88/08,436.

The polysiloxanes used as component b) preferably contain on average 1 to 2.5 amido groups per 100 silicon atoms. The number of amido groups present in a given polysiloxane per silicon atom can be determined by the following method: the number of silicon atoms is determined, for example, via $^{29}Si$ NMR spectroscopy and the number of amido groups by Kjeldahl nitrogen analysis. If primary and/or secondary amino groups are additionally present, their number is detected in the Kjeldahl analysis at the same time and will therefore have to be subtracted. This is possible after they have been determined separately by means of potentiometric titration, in which the significantly less basic amido groups are not detected.

The dispersions according to the invention have the advantage that, owing to the presence of nitrogen-free polysiloxanes containing hydroxyl groups, the percentage of customarily used dispersants can be kept lower than in the case of known dispersions of amido-functional polysiloxanes. This has favourable effects on the rubfastness of textile sheet-like materials which are finished using the dispersions according to the invention. If desired, the addition of dispersants can even be omitted entirely, for example in those cases where, owing to the presence of suitable side chains in the polysiloxanes, stable aqueous dispersions are obtained even without addition of dispersants. Side chains of this type can contain, for example, polyoxyethylene or polyoxypropylene units or cationic groups. The presence of cationic groups can have the additional effect that fibre materials can be treated with dispersions according to the invention by an exhaust method. In a preferred embodiment, the dispersions according to the invention contain, apart from components a), b) and, if present, c), a dispersant or a mixture of dispersants in an amount of 25 to 60 parts by weight, relative to 100 parts by weight of the total amount of polysiloxanes. If the dispersions according to the invention are intended to be used for purposes where a higher dispersant content does not have an adverse effect, the amount can even be higher than 60 parts by weight.

Examples of suitable dispersants are nonionic products, such as ethoxylates of fatty alcohols, fatty acids, fatty amines and alkylphenols. Further suitable dispersants are mentioned in WO 88/08,436 and in EP-A 0,138,192.

It is possible to prepare dispersions according to the invention in the form of so-called microemulsions. One of the advantages of microemulsions is that they have excellent stability. They contain the emulsified substances in the form of very small particles and are translucent to transparent. Methods for the preparation of microemulsions, which can also be used in the case of the dispersions according to the invention, are described in EP-A 0,138,192 and in WO 88/08,436 and are apparent from the exemplary embodiments listed below. When the procedure of WO 88/08,436 is followed, the preparation of the dispersions according to the invention in the form of microemulsions must take place with an addition of acid; for this purpose, in particular acetic acid is suitable which, for example, can be used in the form of a 60% strength solution in water. In many cases, a reduction in the emulsifier content compared with those stated in WO 88/08,436 is possible.

Apart from being characterised by the particle sizes given in accordance with EP-A 0,138,192, preferred embodiments of the dispersions according to the invention relating to microemulsions can also be characterised in a different way: microemulsions which are preferred as embodiment are present if "NTU values" of 200 or less are measured by the method described in brochure 3/LTP5/500/8.85 BDA 086 from Dr. Bruno Lange GmbH, Industrial Measuring Instruments, Wiesenstr., Düsseldorf, Germany, pages 3 to 15.

Preferably, components b) and, if present, c) are used in the dispersions according to the invention in such amounts that the average $S_N:S_{Si}$ ratio is in the range from 1:40 to 1:320, preferably 1:40 to 1:110, $S_N$ being the sum of the number of primary amino groups in components b) and c) and $S_{Si}$ the sum of the number of those silicon atoms in components b) and c) to which no nitrogen-containing substituents are bound. These values can be determined analogously to the details given above by $^{29}Si$ NMR and potentiometric titration.

It is favourable for the properties of the dispersions according to the invention and the properties of fibre materials treated therewith if the ratios of the amounts of components a), b) and, if present, c) are such that specific ratios of the number of hydroxyl, amido and amino groups with respect to one another are present. Accordingly, a preferred embodiment consists in choosing these ratios of the amounts in such a manner that the number $Z_{OH}$ of the hydroxyl groups in component a), the total number $Z_{NHCO}$ of the amido groups in components b) and c) and the total number $Z_{NH2}$ of the primary amino groups in components b) and c) show the following ratios with respect to one another:

$-Z_{NH2}:Z_{OH}=1:0.1$ to 1:21, preferably 1:0.1 to 1:3.5 and $-Z_{NH2}:Z_{NHCO}=1:0.2$ to 1:2.5.

Advantageously, the dispersions according to the invention contain 5 to 40% by weight of polysiloxane (sum of components a), b) and c)) and 25 to 60 parts by weight of dispersant or dispersant mixture, relative to 100 parts by weight of the total amount of polysiloxanes. Before their use for the treatment of fibre materials, further substances can, if desired, be added, and the dispersions can be diluted with water to a lower use concentration. Further substances which can be added are products usually used for the finishing of fibre materials, such as, for example, flame retardants, fungicides or the like.

The dispersions according to the invention are highly suitable for the treatment of fibre materials, in particular textile sheet-like structures, which are given a pleasant soft handle by this treatment. The dispersions can be applied to the fibre materials by known methods, for example via a padding process or, if the structure of the products contained in the dispersions is suitable for this, by means of an exhaust method. If desired, they can also be applied by coating.

The invention is now illustrated by means of exemplary embodiments.

EXAMPLE 1

(according to the invention)

In a heatable stirred reactor, the following products (weights given each based on anhydrous products) were added in succession to 560 g of water with stirring:

a) 50 g of polyglycol isotridecyl ether having on average 7 EO units b) 1.6 g of acetic acid (in the form of a 60% strength aqueous solution)

c) 50 g of a polydimethylsiloxane in which on average about 2% of the methyl groups had been replaced by side chains containing amido groups; the siloxane contained no primary amino groups, the side chains containing amido groups had the formula given in claim 9 (where $R^1$ is H, $R^2$ is $CH_3$, x is 1, y is 3, z is 3)

d) 20 g of a polysiloxane containing hydroxyl groups and based on polydimethylsiloxane having on average about 0.19 hydroxyl groups per silicon atom; the siloxane had a viscosity of about 40 mPa.s at 20° C.

e) 70 g of a polysiloxane free of amido groups and based on a polydimethylsiloxane in which a portion of the methyl groups had been replaced by radicals containing primary amino groups.

The numerical ratio of primary amino groups of component e) to the total number of silicon atoms from components c) and e) was about 1:68.

The mixture was heated to 80° C, maintained at 80° C for 30 minutes and then rapidly cooled to 30° C. 240 g of water and 1.3 g of acetic acid (in the form of a 60% strength aqueous solution) were then added, giving an almost clear stable microemulsion.

EXAMPLE 2

(according to the invention)

Example 1 was repeated with no change in the type of products used and the working procedure. Only the amounts of product were changed, i.e.:

Component a): 42.5 g
Component b): 1.4 g
Component c): 40.0 g
Component d): 15.0 g
Component e): 65.0 g.

After heating and cooling, 280 g of water and 1.3 g of acetic acid were added, giving an almost clear stable microemulsion.

EXAMPLE 3

(comparative example not according to the invention)

In this example, the procedure was repeated without addition of polysiloxane containing hydroxyl groups:

The following were added at room temperature to 560 g of water with stirring:

a) 50.0 g of emulsifier (same as component a) from Example 1)

b) 1.6 g of acetic acid (same as component b) from Example 1)

c) 50.0 g of amido-functional polysiloxane (same as component c) from Example 1)

d) 70.0 g of amino-functional polysiloxane (same as component e) from Example 1).

After heating and cooling, 230 g of water and 1.3 g of acetic acid were added. Using the amount mentioned of emulsifier, it was not possible to obtain a stable dispersion.

Fabrics finished using the microemulsions from Examples 1 and 2 showed only a low tendency to yellow.

We claim:

1. An aqueous dispersion comprising at least the following components:

a) a nitrogen-free polysiloxane having on average at least 2 hydroxyl groups directly bound to one silicon atom each b) a polysiloxane containing on average at least one amido group in the molecule with the proviso that either component b) additionally contains at least one primary amino group or that the dispersion additionally contains, as component c), a polysiloxane having on average at least one primary amino group in the molecule.

2. A dispersion according to claim 1, wherein one or both of components b) and c) additionally contains on average at least one secondary amino group.

3. A dispersion according to claim 1, wherein components a), b) and c) are polysiloxanes in which all radicals bound to silicon atoms and not containing any oxygen atoms or nitrogen atoms are methyl radicals.

4. A dispersion according to claim 1, wherein it additionally contains a dispersant or a mixture of dispersants in an amount of 25 to 60 pans by weight, relative to 100 parts by weight of the total amount of polysiloxanes.

5. A dispersion according to claim 1, wherein component a) is a liquid having a viscosity of 30 to 70 mPa.s at 20° C.

6. A dispersion according to claim 1, characterised in that component a) contains on average 0.1 to 0.5 hydroxyl groups per silicon atom.

7. A dispersion according to claim 1, wherein component b) is a polydimethylsiloxane in which one or more methyl groups are each replaced by the radical R and that each of these radicals R contains 2 nitrogen atoms.

8. A dispersion according to claim 7, wherein some or all of the radicals R contain a secondary amino group and an amido group each.

9. A dispersion according to claim 1, wherein component b) is a polysiloxane containing one or more radicals bound to one silicone atom each of the formula

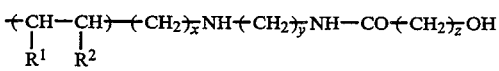

in which $R^1$ and $R^2$, independently of one another, are H or $CH_3$, but at least one of these radicals is H, x is a number from 0 to 3 and y and z, independently of one another, are a number from 2 to 4.

10. A dispersion according to claim 1, wherein component c) is a polydimethylsiloxane in which one or more methyl groups are each replaced by a radical of the formula $-(CHR^3)_t-NH^2$ or a radical of the formula

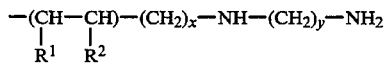

in which $R^1$ and $R^2$, independently of one another, are H or $CH_3$, but at least one of these radicals is H, x is a number from 0 to 3, y is a number from 2 to 4, t has a value from 2 to 4, and all radicals $R^3$ are, independently of one another, H or $CH_3$.

11. A dispersion according to claim 1, wherein component b) contains on average 1 to 2.5 amido groups per 100 silicon atoms.

12. A dispersion according to claim 1, wherein the average $S_N:S_{Si}$ ratio is in the range from 1:40 to 1:320, $S_N$ being the sum of the number of primary amino groups in components b) and c) and $S_{Si}$ the sum of the number of those silicon atoms in components b) and c) to which no nitrogen-containing substituents are bound.

13. A dispersion according to claim 1, wherein the number $Z_{OH}$ of the hydroxyl groups in component a), the total number $Z_{NHCO}$ of the amido groups in components b) and c) and the total number $Z_{NH2}$ of the primary amino groups in components b) and c) show the following ratios with respect to one another:

-$Z_{NH2}:Z_{OH}$ is 1:0.1 to 1:21, and

-$Z_{NH2}:Z_{NHCO}$ is 1:0.2 to 1:2.5.

14. A dispersion according to claim 1, wherein the dispersion contains 5 to 40% by weight of the polysiloxanes.

15. A dispersion of claim 12 wherein the average $S_N:S_{Si}$ ratio is from 1:40 to 1:110.

16. A dispersion of claim 13 wherein the ratio $Z_{NH2}:Z_{OH}$ is from 1:0.1 to 1:3.5.

* * * * *